United States Patent
Ahn et al.

(10) Patent No.: US 9,684,711 B2
(45) Date of Patent: Jun. 20, 2017

(54) SYSTEM AND METHOD FOR PROVIDING AGENT SERVICE TO USER TERMINAL

(71) Applicant: LG CNS CO., LTD., Seoul (KR)

(72) Inventors: Jee Won Ahn, Seoul (KR); Nam Kyu Kang, Seoul (KR); Dong Kuk Park, Seoul (KR); Sung Woo Park, Seoul (KR)

(73) Assignee: LG CNS CO., LTD., Seoul (KR)

( * ) Notice: Subject to any disclaimer, the term of this patent is extended or adjusted under 35 U.S.C. 154(b) by 224 days.

(21) Appl. No.: 14/465,450

(22) Filed: Aug. 21, 2014

(65) Prior Publication Data
US 2015/0058373 A1 Feb. 26, 2015

(30) Foreign Application Priority Data
Aug. 22, 2013 (KR) .................. 10-2013-0099511

(51) Int. Cl.
G06F 7/00 (2006.01)
G06F 17/30 (2006.01)

(52) U.S. Cl.
CPC ...... *G06F 17/3064* (2013.01); *G06F 17/3097* (2013.01); *G06F 17/30654* (2013.01)

(58) Field of Classification Search
CPC ............................................... G06F 17/30654
See application file for complete search history.

(56) References Cited

U.S. PATENT DOCUMENTS

| 5,890,139 A * | 3/1999 | Suzuki .................. G06Q 30/06 379/45 |
| 6,438,580 B1 * | 8/2002 | Mears .................... G06Q 10/10 709/204 |
| 6,526,404 B1 * | 2/2003 | Slater ................ G06F 17/30867 707/728 |
| 7,092,936 B1 | 8/2006 | Alonso et al. |
| 2003/0078779 A1 * | 4/2003 | Desai ........................ G06F 3/16 704/257 |
| 2004/0044542 A1 * | 3/2004 | Beniaminy ............ G06N 5/022 706/45 |

(Continued)

FOREIGN PATENT DOCUMENTS

| CN | 101243437 | 8/2008 |
| KR | 10-2008-0075748 A | 8/2008 |
| KR | 10-2008-0114100 A | 12/2008 |

OTHER PUBLICATIONS

Korean Office Action for Application 10-2013-0099511 dated Jul. 30, 2014.

(Continued)

*Primary Examiner* — Charles Lu
(74) *Attorney, Agent, or Firm* — KED & Associates, LLP

(57) ABSTRACT

A method may provide an agent service to a user terminal by including receiving a user instruction from the user terminal, determining whether at least one agent reply to at least one keyword included in the user instruction is able to be searched for in a database, providing at least one suggestive query to the user terminal to allow a search for the at least one agent reply, receiving at least one set of additional information with respect to the at least one suggestive query from the user terminal, and providing the at least one agent reply to the user terminal based on the at least one set of additional information.

10 Claims, 5 Drawing Sheets

(56) References Cited

U.S. PATENT DOCUMENTS

2007/0043878 A1* 2/2007 Carlson ............ G06F 17/30905
709/246
2008/0319962 A1 12/2008 Riezler et al.
2009/0030856 A1* 1/2009 Arena .................... G06Q 10/10
706/11
2012/0117051 A1 5/2012 Liu et al.

OTHER PUBLICATIONS

European Search Report issued in Application No. 14181960.7 dated Feb. 26, 2015.

* cited by examiner

SYSTEM AND METHOD FOR PROVIDING AGENT SERVICE TO USER TERMINAL

CROSS-REFERENCE TO RELATED APPLICATION

This application claims the priority benefit of Korean Patent Application No. 10-2013-0099511, filed Aug. 22, 2013, the subject matter of which is incorporated herein by reference.

BACKGROUND

1. Field

Embodiments may relate to a system and a method for providing an agent service to a user terminal. Embodiments may relate to technology for providing an agent reply to a user terminal by searching for the agent reply that is prestored in an agent database.

2. Background

Technology for providing an agent service to a user terminal may include searching for an agent reply to a user instruction received from the user terminal from among a plurality of agent replies stored in a database and providing the agent reply to the user terminal. However, when the agent reply to the user instruction is not found in the database search for the agent reply, technology may not provide an agent service.

For example, Korean Patent Publication No. 10-2012-0055772, entitled "System and Method for Providing Service Agent" relates to searching for a service agent corresponding to characteristics of a terminal and a user of the terminal from a user based service list storing unit and providing the service agent. However, when the service agent corresponding to the characteristics is not present (or is absent) in the service list storing unit, the service agent corresponding to the characteristics may not be found.

Accordingly, there may be a desire for technology to search for an agent reply to a user instruction through a user terminal despite absence of the agent reply corresponding to the user instruction in a database.

BRIEF DESCRIPTION OF THE DRAWINGS

Embodiments may be described in detail with reference to the following drawings in which like reference numerals refer to like elements and wherein.

DETAILED DESCRIPTION

Figure 1:
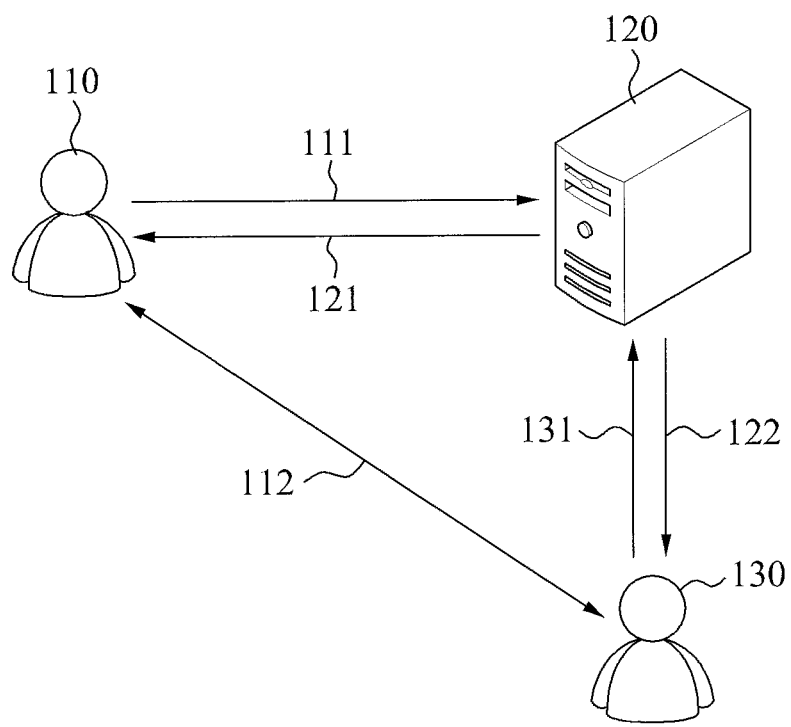
FIG. 1 is a diagram of a system for providing an agent service to a user terminal according to an embodiment.

Reference may now be made in detail to exemplary embodiments, examples of which may be illustrated in the accompanying drawings, wherein like reference numerals refer to the like elements throughout. Exemplary embodiments may be described below by referring to the accompanying drawings; however, embodiments are not limited thereto or restricted thereby.

When it is determined a detailed description related to a related known function or configuration that may make the purpose of the embodiment unnecessarily ambiguous, the detailed description may be omitted. Additionally, terms used herein may be defined to appropriately describe exemplary embodiments and thus may be changed depending on a user, an intent of an operator, and/or a custom. Accordingly, terms may be defined based on the following overall description.

FIG. 1 is a diagram of a system for providing an agent service to a user terminal according to an embodiment. Other embodiments and configurations may also be provided.

FIG. 1 shows a system for providing an agent service to a user terminal. The system may include a user 110 of the user terminal, a server 120, and an expert 130. The user 110 of the user terminal may be simply referred to as the user 110. Operations performed between the user 110 and the server 120, and the user 110 and the expert 130 may be operations performed between the user terminal and the server 120, and the user terminal and an expert terminal.

In operation 111, the server 120 may receive a user instruction from the user 110. In operation 121, the server 120 may provide at least one agent reply (corresponding to the user instruction) to the user 110. The agent reply may include at least one of a reply expressed as a text or graphics corresponding to the user instruction, and an execution of an agent service corresponding to the user instruction. The server 120 may verify whether the agent reply corresponds to a request or an instruction by the user 110 prior to execution of the service. For example, the server 120 may verify whether the agent reply corresponding to the user instruction is provided by transmitting a verification message to the user 110 prior to providing the agent reply to the user 110.

Additionally, in operation 121, the server 120 may extract at least one keyword included in the user instruction, search for at least one agent reply to the extracted at least one keyword (by referring to a prestored database), and provide the at least one found agent reply to the user 110. The server 120 may determine whether the user instruction includes parameters required for the at least one agent reply based on a predetermined standard. When the user instruction is determined to include the required parameters, the server 120 may search for the at least one agent reply corresponding to the user instruction in the database and provide the at least one agent reply to the user 110. Conversely, when the user instruction is determined to not include the required parameters, the server 120 may provide at least one suggestive query to the user 110 to allow the search for the at least one agent reply, receive additional information with respect to the at least one suggestive query, and search for the at least one agent reply in the database based on the additional information. Additionally, the server 120 may store (in the database of the server 120) at least one keyword, at least one set of additional information, and at least one agent reply to the at least one keyword.

The suggestive query may be provided by using a graphic output method. For example, the suggestive query may provide, in a form of a checkbox, at least one candidate keyword included in a category associated with the at least one keyword, and/or may be provided in a form of a tree corresponding to the category.

When the at least one agent reply to the at least one keyword is not found during the database search for the at least one agent reply, the server 120 may select the expert 130 corresponding to the at least one keyword by referring to the database in operation 122, receive at least one expert reply to the at least one keyword from the expert 130 in operation 131, and provide the at least one expert reply to the user 110. For example, when the user instruction received from the user 110 includes the parameters required for the agent reply to the at least one keyword, and the at least one agent reply to the at least one keyword is not found as a result of the database search for the at least one agent reply to the at least one keyword, the server 120 may select the expert 130 in operation 122, and receive an expert reply to the at least one keyword from the selected expert 130 in operation 131. When the expert 130 corresponding to the at least one keyword is absent (or not present), the server 120 may provide at least one suggestive query to the user 110 to allocate the expert 130 for the user instruction, receive at least one set of additional information with respect to the at least one suggestive query from the user 110, and select the expert 130 corresponding to the at least one set of additional information. The server 120 may store (in the database of the server 120) at least one additional keyword, at least one set of additional information, and at least one expert reply. Additionally, the server 120 may provide a communication channel 112 with the expert 130 to provide the expert reply to the user 110.

Figure 2:
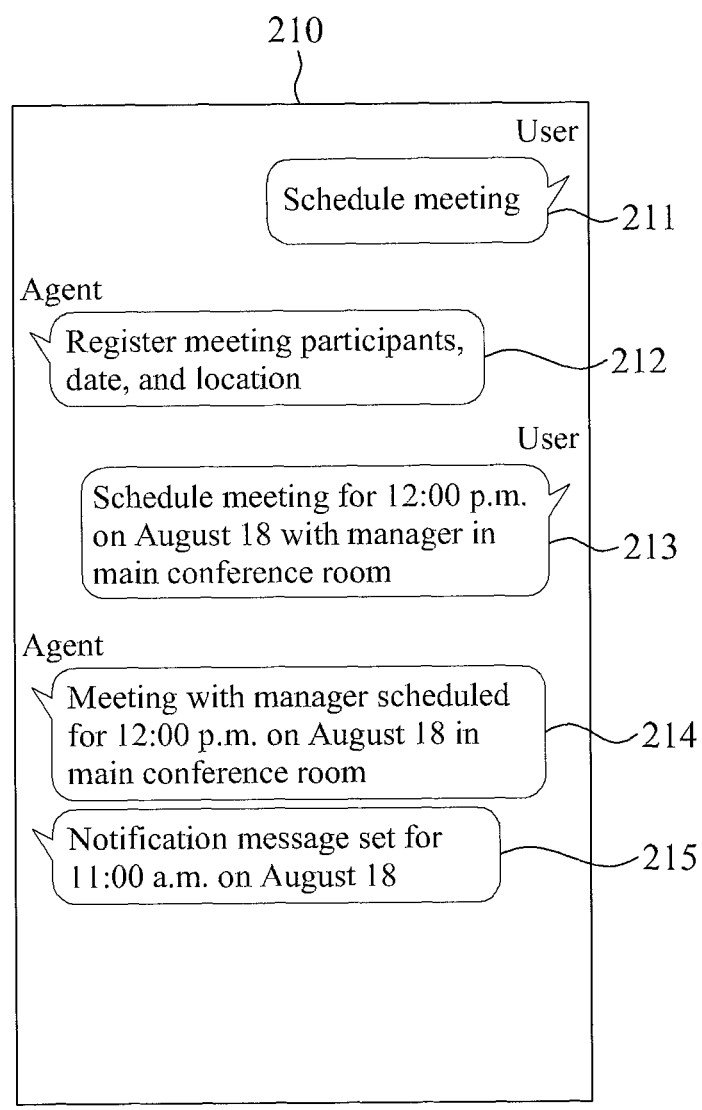
FIG. 2 is a diagram of a display of a user terminal to which an agent reply is provided by referring to a database according to an embodiment.

FIG. 2 is a diagram of a display 210 of a user terminal to which an agent reply is provided (by referring to a database) according to an embodiment. Other embodiments and configurations may also be provided.

Referring to FIG. 2, at least one agent reply may be provided by searching for a reply to at least one keyword extracted from a user instruction (by referencing database). A system for providing the agent reply to the user terminal may determine whether the user instruction includes parameters required for the at least agent reply based on a predetermined standard. When the user instruction is determined not to include the required parameters, the system may provide at least one suggestive query with respect to the user instruction to the user terminal, receive at least one set of additional information with respect to the at least one suggestive query, and once again determine whether the received set of additional information includes the parameters required for the at least one agent reply based on the predetermined standard. Such a process may be repeatedly performed a predetermined number of times or until the user instruction includes the parameters required for the at least one agent reply based on the predetermined standard.

When the user instruction and the at least one set of additional information are determined to include the required parameters, the system may provide the at least one agent reply (retrieved from the database) to the user terminal.

For example, when a user instruction 211 (for example, "schedule meeting") is received from the user, the system may extract at least one keyword (for example, "meeting") from the user instruction 211. The system may set (or determine) a category of at least one agent reply corresponding to the user instruction 211 to be a scheduling category based on the keyword "meeting." When the category of the agent reply is set, the system may determine whether the user instruction 211 includes parameters required for the at least one agent reply based on the predetermined standard. As a result of the determining, the user instruction 211 includes parameters such as "meeting" and "schedule."

However, the user instruction 211 does not include parameters such as "participants," "date," and "location" and thus, the system may provide at least one suggestive query 212 to the user (for example, "register meeting participants, date, and location"). In response to the suggestive query 212, the user may transmit, to the system, at least one set of additional information 213 (for example, "schedule meeting for 12:00 p.m. on August 18 with manager in main conference room"). Then, all parameters required for the agent reply may be included in the user instruction 211 and the additional information 213 and thus, the system may search for at least one first agent reply 214 and at least one second agent reply 215 to the at least one keyword extracted from the database and provide, to the user terminal, the first agent reply 214 (for example, "meeting with manager is scheduled for 12:00 p.m. on August 18 in main conference room") and the second agent reply 215 (for example, "notification message is set for 11:00 a.m. on August 18"). The second agent reply 215 may include execution of a preset agent service corresponding to the user instruction 211 and the additional information 213. As another example, the second agent reply 215 may include execution of a notification service to provide a notification message to the user terminal. The system may verify whether an agent reply corresponding to the user instruction 211 and the additional information 213 is provided by transmitting a verification message to the user terminal prior to providing the second agent reply 215 to the user terminal.

Figure 3:
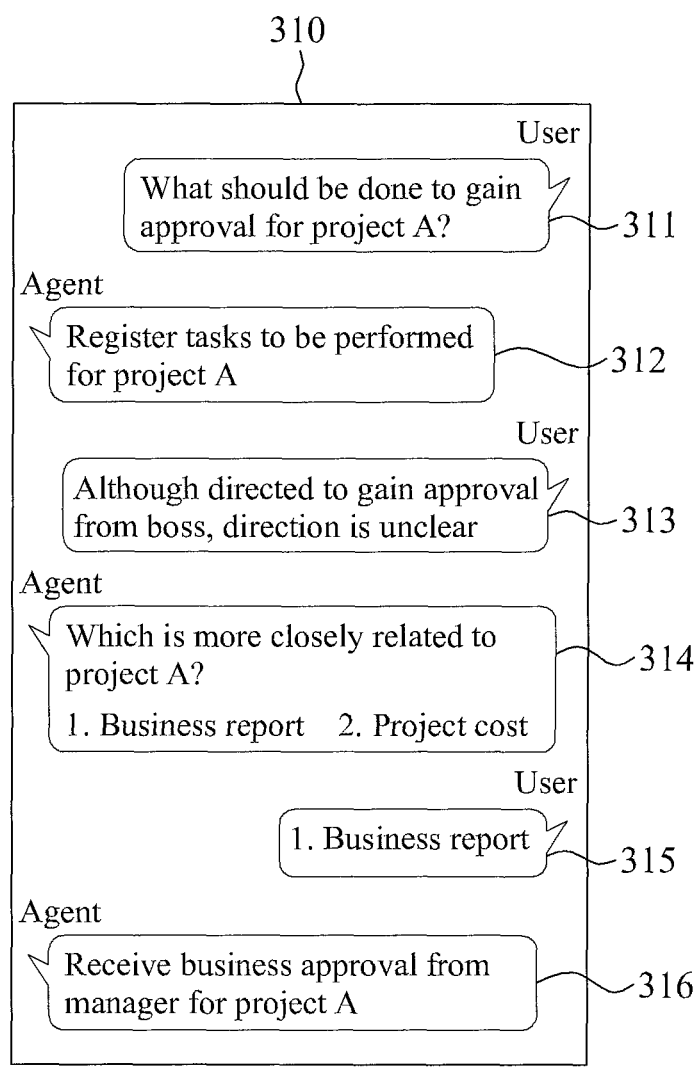
FIG. 3 is a diagram of a display of a user terminal to which an expert reply is provided by referring to a database according to an embodiment.

FIG. 3 is a diagram of a display 310 of a user terminal to which an expert reply is provided (by referring to a database) according to an embodiment. Other embodiments and configurations may also be provided.

Referring to FIG. 3, when at least one agent reply (corresponding to at least one keyword extracted from a user instruction) is not found, a system for providing an agent service to the user terminal may select an expert corresponding to the at least one keyword by referring to the database, receive at least one expert reply to the at least one keyword from the selected expert, and provide the at least one expert reply to the user terminal. When the expert corresponding to the at least one keyword is absent, the system may provide at least one suggestive query to the user terminal to allocate an expert for the user instruction, receive at least one set of additional information with respect to the at least one suggestive query from the user terminal, and select the expert corresponding to the at least one set of additional information.

For example, when a user instruction 311 (for example, "what should be done to gain an approval for project A?") is received from a user, the system may extract at least one keyword (for example, "project A") from the user instruction 311 and set (or determine) a category of at least one agent reply corresponding to the user instruction 311 to be a category of the project A. When the category of the agent reply is set, the system may determine whether the user instruction 311 includes parameters required for the agent reply based on a predetermined standard. As a result of the determining, the system may determine that the user instruction 311 includes parameters such as "project A" and "approva," without a parameter such as "what" and thus the system may provide, to the user, at least one first suggestive query 312 (for example, "register tasks to be performed for project A"). When the user transmits at least one set of first additional information 313 to the system (for example, "although directed to gain an approval from a boss, the direction is unclear") in response to the first suggestive query 312, the system may search for an agent reply corresponding to the user instruction 311 and the first additional information 313 with respect to the category of the keyword "project A." However, when the agent reply is not found in a database due to a parameter "the direction is unclear," the system may select an expert corresponding to the keyword by referring to the database, receive at least one expert reply from the selected expert, and provide the at least one expert reply to the user terminal.

When the expert corresponding to the at least one keyword is absent, the system may provide the at least one suggestive query to the user terminal to allocate the expert for the user instruction, receive the at least one set of additional information with respect to the at least one suggestive query, and select the expert corresponding to the at least one set of additional information. For example, when the expert corresponding to the keyword "project A" is absent in the database, the system may provide, to the user terminal, at least one second suggestive query 314, receive an expert reply 316 to at least one set of second additional information 315 from the expert corresponding to the second additional information 315 based on the additional information 315, and provide the expert reply 316 to the user terminal.

Figure 4:
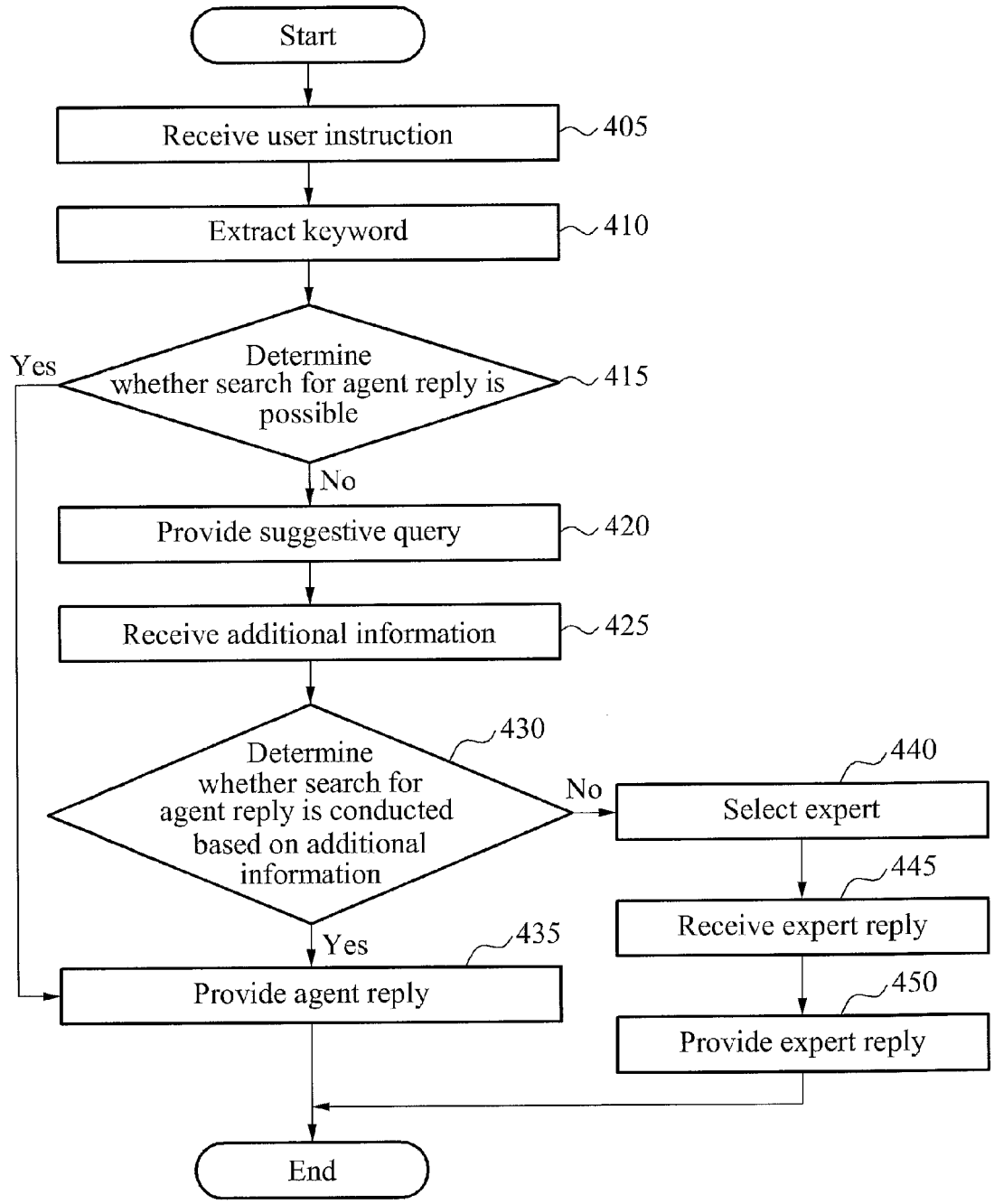
FIG. 4 is a flowchart of a method of providing an agent service to a user terminal according to an embodiment.

FIG. 4 is a flowchart of a method of providing an agent service to a user terminal according to an embodiment. Other operations, orders of operations and embodiments may also be provided.

Referring to FIG. 4, in operation 405, a system for providing the agent service to the user terminal may receive a user instruction from the user terminal.

In operation 410, the system may extract at least one keyword from the received user instruction.

In operation 415, the system may determine whether at least one agent reply to the at least one keyword (included in the user instruction) may be searched for in a database. The operation of determining whether the at least one agent reply to the at least one keyword is searchable may include determining whether the user instruction includes parameters required for the at least one agent reply based on a predetermined standard.

In operation 420, the system may provide (to the user terminal) at least one suggestive query to allow the search for the at least one agent reply based on a result of the determining. When the user instruction is determined to not include the required parameters, the system may provide (to the user terminal) the at least one suggestive query with respect to the user instruction.

In operation 425, the system may receive at least one set of additional information with respect to the at least one suggestive query from the user terminal.

In operation 430, the system may determine whether the at least one agent reply to the at least one keyword is found in the database based on the additional information.

In operation 440, when the at least one agent reply to the at least one keyword is not found in the database based on the at least one set of additional information, the system may select an expert corresponding to the at least one keyword by referring to the database. When the expert corresponding to the at least one keyword is absent (or not provided), the system may provide at least one suggestive query to the user terminal to allocate the expert for the user instruction, receive at least one set of additional information with respect to the at least one suggestive query from the user terminal, and select the expert corresponding to the at least one set of additional information.

In operation 445, the system may receive at least one expert reply to the at least one keyword from the expert. The system may receive the at least one expert reply to the at least one set of additional information.

In operation 450, the system may provide the at least one expert reply to the user terminal. The system may store (in the database) at least one keyword, at least one set of additional information, and at least one expert reply. The operation of providing the expert reply to the user terminal may include providing a communication channel with the expert to the user terminal.

In operation 435, when the at least one agent reply to the at least one keyword is found in the database based on the at least one set of additional information, the system may provide the at least one agent reply to the user terminal based on the at least one set of additional information. Additionally, as a result of the determining, the system may provide the at least one agent reply to the user instruction to the user terminal. When the user instruction includes the required parameters, the system may provide the at least one agent reply to the user terminal based on the user instruction. The operation of providing the at least one agent reply to the user terminal may include an operation of executing at least one preset agent service corresponding to the user instruction. Additionally, the system may transmit a verification message to the user terminal to verify whether the agent reply corresponds to at least one of the user instruction and the additional information prior to providing the agent reply to the user terminal.

Additionally, the system may store (in the database) at least one keyword, at least one set of additional information, and at least one agent reply.

Figure 5:
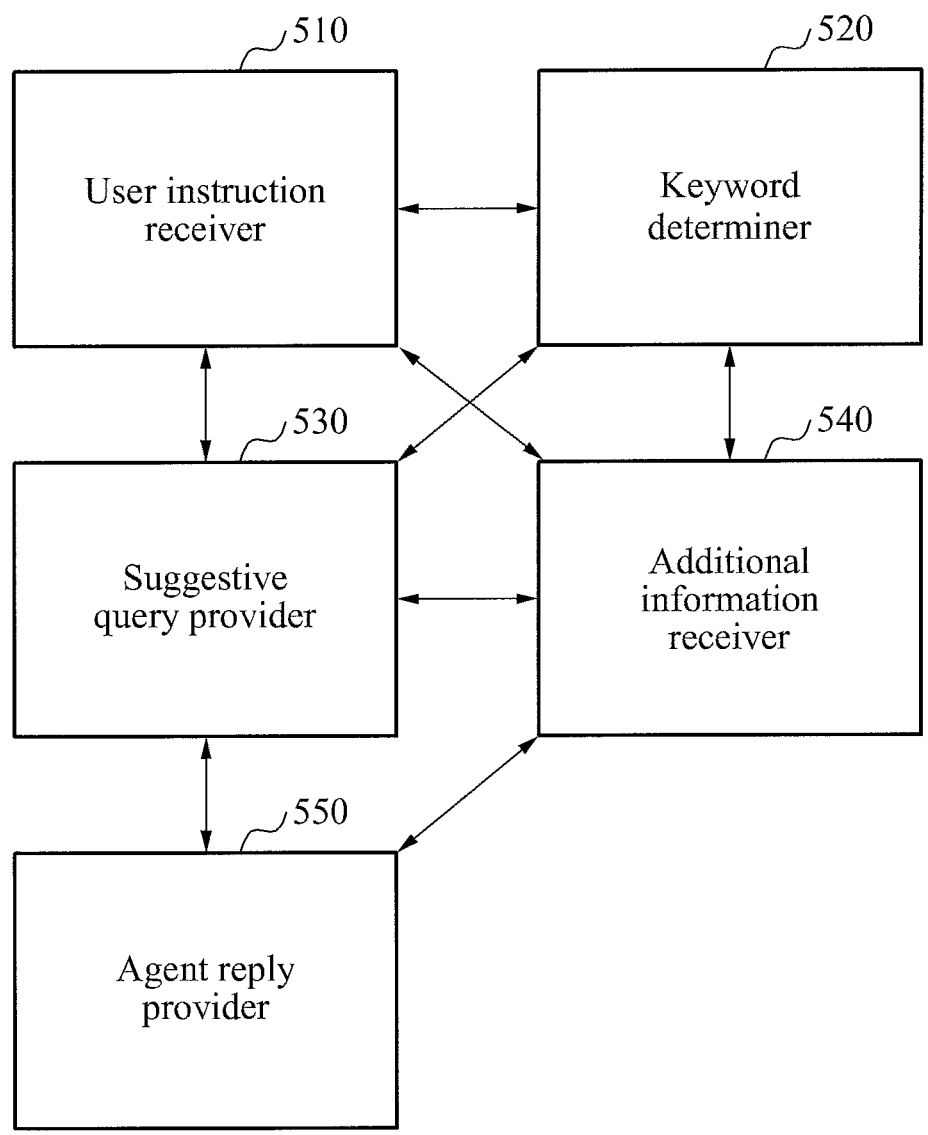
FIG. 5 is a block diagram of a system for providing an agent service to a user terminal according to an embodiment.

FIG. 5 is a block diagram of a system for providing an agent service to a user terminal according to an embodiment. Other embodiments and configurations may also be provided.

Referring to FIG. 5, the system may include a user instruction receiver 510, a keyword determiner 520, a suggestive query provider 530, an additional information receiver 540, and an agent reply provider 550.

The user instruction receiver 510 may receive a user instruction from the user terminal.

The keyword determiner 520 may determine whether at least one agent reply to at least one keyword (included in the user instruction) may be searched for in a database.

The keyword determiner 520 may determine whether the user instruction includes parameters required for the at least one agent reply based on a predetermined standard.

Based on a result of the determining, the suggestive query provider 530 may provide at least one suggestive query to the user terminal to allow a search for the at least one agent reply.

When the user instruction is determined to not include the required parameters, the suggestive query provider 530 may provide the at least one suggestive query with respect to the user instruction to the user terminal.

Additionally, when an expert corresponding to the at least one keyword is absent, the suggestive query provider 530 may provide at least one suggestive query to the user terminal to allocate the expert for the user instruction.

The additional information receiver 540 may receive at least one set of additional information with respect to the at least one suggestive query from the user terminal.

The agent reply provider 550 may provide at least one agent reply to the user terminal based on the at least one set of additional information.

When the user instruction is determined to include the required parameters, the agent reply provider 550 may provide the at least one agent reply to the user terminal based on the user instruction.

Additionally, the agent reply provider 550 may execute at least one preset agent service corresponding to the user instruction.

The system may further include a keyword extractor to extract at least one keyword from a received user instruction.

When the at least one agent reply to the at least one keyword is not found in the database based on the additional information, the system may further include an expert selector to select an expert corresponding to the at least one keyword by referring to the database, an expert reply receiver to receive at least one expert reply to the at least one keyword from the selected expert, and an expert reply provider to provide the at least one expert reply to the user terminal.

The expert selector may select the expert corresponding to the at least one set of additional information.

The expert reply receiver may receive the at least one expert reply to the at least one set of additional information from the expert.

The system may further include a storing unit to store (in the database) at least one keyword, at least one set of additional information, and at least one expert reply.

The storing unit may store (in the database) at least one keyword, at least one set of additional information, and at least one agent reply.

According to example embodiments, there is provided a method, an apparatus, and a system for providing an agent reply corresponding to a user instruction to a user terminal.

According to example embodiments, there is provided a method, an apparatus, and a system for searching for an agent reply to a keyword by referring to a database using the keyword included in a user instruction to provide the agent reply corresponding to the user instruction.

According to example embodiments, there is provided a method, an apparatus, and a system for searching for an agent reply based on additional information by receiving the additional information when the agent reply corresponding to a keyword is absent in a database.

According to example embodiments, there is provided a method, an apparatus, and a system for providing an expert reply received from an expert corresponding to a keyword and additional information when an agent reply corresponding to a user instruction is absent in a database.

According to example embodiments, there is provided a method, an apparatus, and a system for providing an agent service to a user terminal based on an expert reply.

According to example embodiments, there is provided a method, an apparatus, and a system for providing a query including a reply that may be independently recognized by an agent to a user and selecting the recognizable reply by the user, and thereby improving reliability in using the system.

According to example embodiments, a method, an apparatus, and a system for providing an agent reply corresponding to a user instruction to a user terminal.

According to example embodiments, a method, an apparatus, and a system may search for an agent reply to a keyword by referring to a database using the keyword included in a user instruction to provide the agent reply corresponding to the user instruction.

According to example embodiments, a method, an apparatus, and a system may search for an agent reply based on additional information by receiving the additional information when the agent reply to a keyword is absent in a database.

According to example embodiments, a method, an apparatus, and a system may provide an expert reply received from an expert corresponding to a keyword and additional information when an agent reply corresponding to a user instruction is absent in a database.

According to example embodiments, a method, an apparatus, and a system may provide an agent service to a user terminal based on an expert reply.

According to an embodiment, a method may provide an agent service to a user terminal. The method may include receiving a user instruction from the user terminal, determining whether at least one agent reply to at least one keyword included in the user instruction is able to be searched for in a database, and providing at least one suggestive query to the user terminal based on a result of the determining to allow a search for the at least one agent reply. The method may also include receiving at least one set of additional information with respect to the at least one suggestive query from the user terminal, and providing the at least one agent reply to the user terminal based on the at least one set of additional information.

The providing of the at least one agent reply may include executing at least one preset agent service corresponding to the user instruction.

The determining of whether at least one agent reply is able to be searched may include determining whether the user instruction includes parameters required for the at least one agent reply based on a predetermined standard. When the user instruction is determined not to include the parameters, the providing of the at least one suggestive query may include providing, to the user terminal, the at least one suggestive query with respect to the user instruction.

When the user instruction is determined to include the parameters, the method may further include providing, to the user terminal, the at least one agent reply based on the user instruction.

The method may further include extracting the at least one keyword from the received user instruction.

The suggestive query may be provided through a graphic output method.

The suggestive query may provide, in a form of a checkbox, at least one candidate keyword included in a category associated with the at least one keyword.

The suggestive query may be provided in a form of a tree corresponding to the category.

When the at least one agent reply to the at least one keyword is not found in the database based on the at least one set of additional information, the method may further include selecting an expert corresponding to the at least one keyword by referring to the database, receiving at least one expert reply to the at least one keyword from the expert, and providing the at least one expert reply to the user terminal.

When the expert corresponding to the at least one keyword is absent, the method may further include providing the at least one suggestive query to the user terminal to allocate the expert for the user instruction, receiving the at least one set of additional information with respect to the at least one suggestive query from the user terminal, selecting the expert corresponding to the at least one set of additional information, and receiving the at least one expert reply to the at least one set of additional information from the expert.

The method may further include storing, in the database, the at least one keyword, the at least one set of additional information, and the at least one expert reply.

The providing of the expert reply to the user terminal may further include providing a communication channel with the expert to the user terminal.

The method may further include storing, in the database, the at least one keyword, the at least one set of additional information, and the at least one agent reply.

According to an embodiment, a method may provide an agent service to a user terminal. The method may include receiving a user instruction from the user terminal, determining whether at least one agent reply to at least one keyword included in the user instruction is able to be searched for in a database, determining whether the user instruction includes parameters required for the at least one agent reply based on a predetermined standard, and providing the at least one agent reply to the user terminal based on at least one set of additional information.

According to an embodiment, a system may provide an agent service to a user terminal. The system may include a user instruction receiver to receive a user instruction from the user terminal, a keyword determiner to determine whether at least one agent reply to at least one keyword included in the user instruction is able to be searched for in a database, a suggestive query provider to provide at least one suggestive query to the user terminal to allow a search for the at least one agent reply, an additional information receiver to receive at least one set of additional information with respect to the at least one suggestive query from the user terminal, and an agent reply provider to provide the at least one agent reply to the user terminal based on the at least one set of additional information.

The agent reply provider may execute at least one preset agent service corresponding to the user instruction.

The keyword determiner may determine whether the user instruction includes parameters required for the at least one agent reply based on a predetermined standard. When the user instruction is determined not to include the parameters, the suggestive query provider may provide the at least one suggestive query with respect to the user instruction to the user terminal.

When the user instruction is determined to include the parameters, the agent reply provider may provide the at least one agent reply to the user terminal based on the user instruction.

The system may further include a keyword extractor to extract the at least one keyword from the received user instruction.

When the at least one agent reply to the at least one keyword is not found in the database based on the at least one set of additional information, the system may further include an expert selector to select an expert corresponding to the at least one keyword by referring to the database, an expert reply receiver to receive at least one expert reply to the at least one keyword from the expert, and an expert reply provider to provide the at least one expert reply to the user terminal.

When the expert corresponding to the at least one keyword is absent, the suggestive query provider may provide the at least one suggestive query to the user terminal to allocate the expert for the user instruction, the additional information receiver may receive the at least one set of additional information with respect to the at least one suggestive query from the user terminal, the expert selector may select the expert corresponding to the at least one set of additional information, and the expert reply receiver may receive the at least one expert reply to the at least one set of additional information from the expert.

The system may further include a storing unit to store (in the database) the at least one keyword, the at least one set of additional information, and the at least one expert reply.

The storing unit may store (in the database) the at least one keyword, the at least one set of additional information, and the at least one agent reply.

The units described herein may be implemented using hardware components and/or software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, optical data storage devices. Also, functional programs, codes, and code segments that accomplish the examples disclosed herein can be easily construed by programmers skilled in the art to which the examples pertain based on and using the flow diagrams and block diagrams of the figures and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of providing an agent service to a user terminal, the method comprising:
   receiving, at a server, a user instruction from the user terminal;
   extracting, at the server, a keyword from the received user instruction;
   determining, at the server, whether at least one agent reply to the extracted keyword included in the user instruction is to be searched, wherein the determining of whether the agent reply is to be searched includes determining whether the user instruction includes parameters for the agent reply based on a predetermined standard;
   in response to the server determining that the user instruction includes the parameters, providing, to the user terminal, the agent reply based on the user instruction; and
   in response to the server determining that the user instruction does not include the parameters, the method including:
   a) providing, from the server and to the user terminal, at least one suggestive query with respect to the user instruction;
   b) receiving, at the server and from the user terminal, additional information with respect to the suggestive query; and
   c) in response to receiving the additional information and determining that the agent reply is not found in a database based on the received additional information, performing the following:
      selecting an expert corresponding to the extracted keyword by referring to the database,
      receiving at least one expert reply to the extracted keyword from the expert, and
      providing the expert reply to the user terminal by providing a communication channel between the expert and the user terminal,
   wherein when the expert corresponding to the extracted keyword is absent, the method further comprises:
      providing, at the server, the suggestive query to the user terminal to allocate the expert for the user instruction;
      receiving, at the server, the additional information with respect to the suggestive query from the user terminal;
      selecting, at the server, the expert corresponding to the additional information; and
      receiving the expert reply to the additional information from the selected expert.

2. The method of claim 1, wherein the providing of the agent reply includes executing at least one preset agent service corresponding to the user instruction.

3. The method of claim 1, wherein the suggestive query is provided based on a graphic output method.

4. The method of claim 3, wherein the suggestive query provides, in a form of a checkbox, at least one candidate keyword included in a category associated with the keyword.

5. The method of claim 4, wherein the suggestive query is provided in a form of a tree corresponding to the category.

6. The method of claim 1, further comprising:
   storing, in the database, the keyword, the additional information, and the expert reply.

7. The method of claim 1, further comprising:
   storing, in the database, the keyword, the additional information, and the agent reply.

8. A non-transitory computer-readable recording medium comprising a program to cause a computer to perform the method of claim 1.

9. A method of providing an agent service to a user terminal, the method comprising:
   receiving, at a server, a user instruction from the user terminal;
   extracting, at the server, a keyword from the received user instruction;
   determining, at the server, whether at least one agent reply to the extracted keyword included in the user instruction is to be searched;
   determining, at the server, whether the user instruction includes parameters for the agent reply based on a predetermined standard;
   in response to the server determining that the user instruction includes the parameters for the agent replay, providing, to the user terminal, the agent reply based on the user instruction; and
   in response to the server determining that the user instruction does not include the parameters for the agent reply, the method including:
      providing, from the server and to the user terminal, at least one suggestive query;
      receiving, at the server, additional information based on the suggestive query; and
      in response to the additional information from the user terminal and determining that the agent reply is not found in a database based on the additional information, the method further comprising:
         selecting an expert corresponding to the extracted keyword by referring to the database;
         receiving at least one expert reply to the extracted keyword from the expert; and providing the expert reply to the user terminal by providing a communication channel between the expert and the user terminal, wherein when the expert corresponding to the extracted keyword is absent, the method further comprises:

providing, at the server, the suggestive query to the user terminal to allocate the expert for the user instruction;

receiving, at the server, the additional information with respect to the suggestive query from the user terminal;

selecting, at the server, the expert corresponding to the additional information; and receiving the expert reply to the additional information from the selected expert.

10. A non-transitory computer-readable recording medium comprising a program to cause a computer to perform the method of claim 9.

* * * * *